Feb. 6, 1951
O. D. McNAIL
2,540,341
SEALED IN BLINKING MINE CAR LIGHT
Filed June 20, 1949
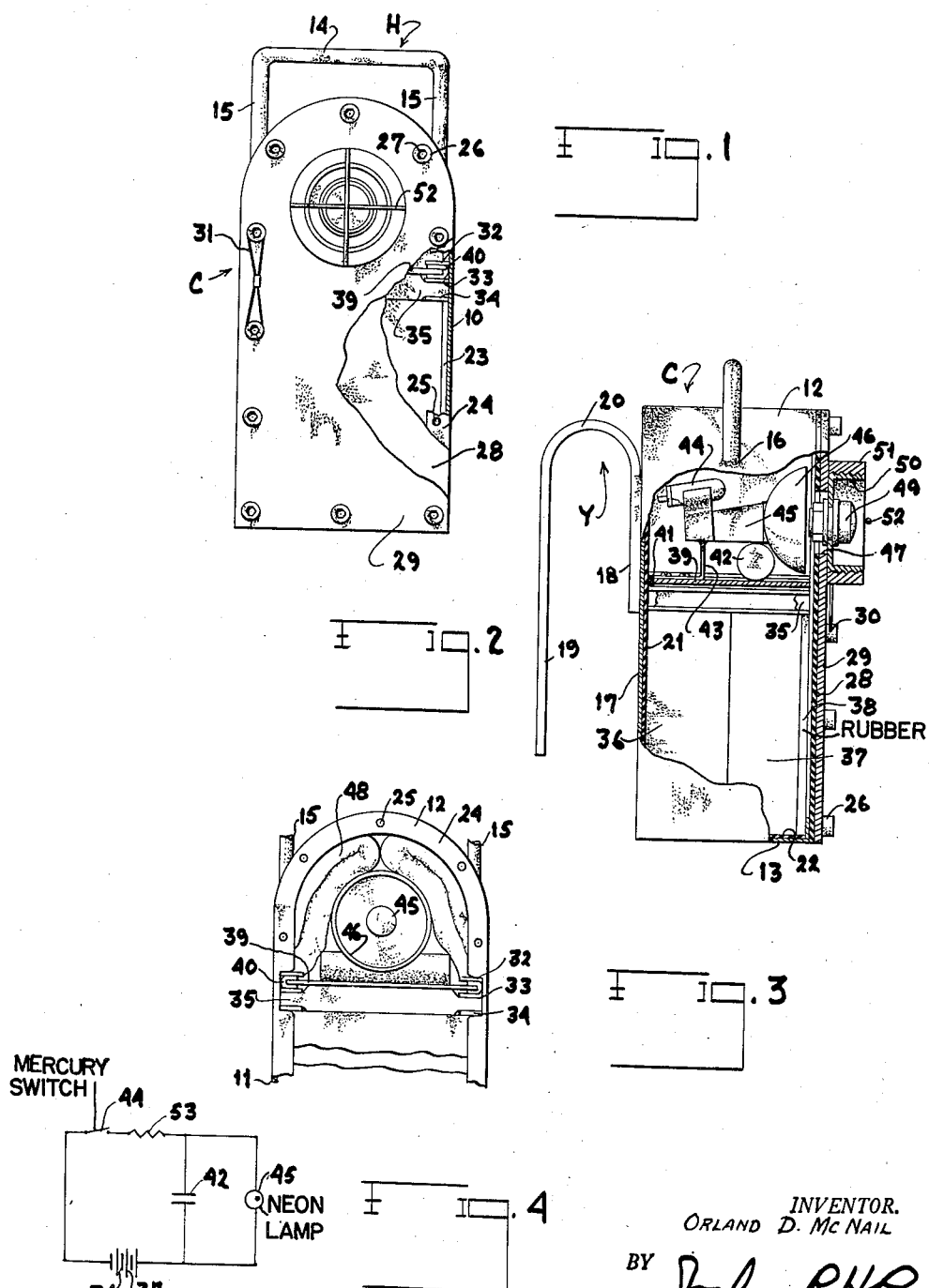
INVENTOR.
ORLAND D. McNAIL
BY
Joshua R. H. Potts
HIS ATTORNEY Patented Feb. 6, 1951

2,540,341

UNITED STATES PATENT OFFICE 2,540,341

SEALED IN BLINKING MINE CAR LIGHT

Orland D. McNail, Christopher, Ill., assignor to Alfred E. Pickard, Mount Vernon, Ill.

Application June 20, 1949, Serial No. 100,156

3 Claims. (Cl. 177—329)

The present invention relates to a light that is designed primarily for use on mine cars and trains and is concerned primarily with a light that is completely self-contained, has a long service life, and is adapted to be detachably secured to the last car of a train.

At the present time, it is common practice in coal mines and similar places to provide a light which will definitely indicate the last car of a train. Without such an indication there is grave danger when trains are run in sections for miners after having gotten out of the path of the first section of a train to return to the track in the belief that the first section was the complete train. In view of this hazardous condition, a light is employed to indicate the last car of any train whether it comprises one or more sections.

The light now commonly employed for this purpose has a relatively short life and has to be changed every eight hours. Obviously, this results in great inconvenience and it is necessary to pay an attendant to make the change.

With the foregoing conditions in mind, the present invention has in view as its foremost objective the provision of a signal light of the type indicated which is entirely self-contained and which has a service life far beyond anything heretofore considered possible in this art.

In carrying out this idea, the invention provides a casing which houses batteries and the various instrumentalities making up the light circuit. Among such instrumentalities is a mercury switch which provides an arrangement in which the position of the casing itself determines whether the light is on or off. In one position of the casing the circuit to the light is completed while in another position the circuit is broken.

Still another object of the invention is to provide a signal light of the type indicated which is of the blinking type, that is, it goes on and off intermittently. In attaining this end, a neon light is employed together with a suitable condenser and under the effect of capacitance the light is intermittently illuminated.

Still another object of the invention is to provide a signal light of the type indicated which is of the sturdy construction that is required by its use in conjunction with mine trains.

Various other more detailed objects and advantages of the invention such as arise in connection with carrying out the above noted ideas in a practical embodiment will, in part become apparent, and in part be hereinafter stated as the description of the invention proceeds.

The invention, therefore, comprises a mine car light which consists essentially of a completely enclosed and self-contained casing that houses the batteries and the various elements making up the electrical circuit for the light and among which are included a neon bulb, a condenser associated therewith, a resistor, and a mercury switch.

For a full and more complete understanding of the invention, reference may be had to the following description and accompanying drawing wherein:

Figure 1 is a view in front elevation with parts broken away of a mine car light designed in accordance with the precepts of this invention.

Figure 2 is a side view partly in section and partly in elevation of the light shown in Figure 1.

Figure 3 is a front view of the upper portion of the light with the front panel removed; and Figure 4 is a wiring diagram of the electrical circuit for the light.

Referring now to the drawing wherein like reference characters denote corresponding parts, and first more particularly to Figures 1 and 2, the light of this invention is shown as including as an essential element a casing which is referred to in its entirety by the reference character C. This casing C should be of a heavy rigid construction which incorporates the necessary ability of withstanding shocks and jars into the casing. Thus, the various walls about to be described are of a heavy rigid construction and are made from a metal such as steel or cast iron.

The casing C comprises a pair of side walls 10 and 11 which are joined at the top by a curved dome-like roof 12. Extending across the lower edges of the side walls 10 and 11 is a bottom wall 13 which is preferably integrally joined to the side walls 10 and 11 or welded thereto.

A handle which is referred to in its entirety by the reference character H comprises a crossbar 14 and downwardly depending legs 15. The free ends of the latter are joined to the casing C substantially where the dome-like top 12 merges in with the side walls 10 and 11. The connection between the handle structure and the casing C is preferably established by welding, such as indicated at 16 in Figure 2.

Secured to the rear edges of the side walls 10 and 11, top 12 and bottom 13 is a rear wall 17 which preferably is welded to the edges of the bottom, top, and side wall structure.

For the purpose of providing means for detachably securing the light in position on a mine car, a U-shaped yoke designated Y is secured to the outer exposed face of the rear wall 17. The yoke Y has a short leg 18 which is preferably welded to the rear wall 17. The yoke Y also includes a long leg 19 which is joined to the leg 18 by a bend 20. It is obvious that the long leg 19 is adapted to be hooked over an appropriate element on a mine car to secure the light in position thereon.

The inner face of the rear wall 17 is covered by a rubber lining 21. Another rubber lining 22 covers the inner face of the bottom 13. The side walls 10 and 11 are also covered with the lining of sheet rubber, such as indicated at 23 in Figure 1.

Extending inwardly from the side walls 10 and 11, bottom 13, and top 12, on the front edge thereof, is a peripheral flange 24 which is formed with a plurality of threaded openings 25. Each of these openings 25 is adapted to receive the threaded shank of a screw bolt 26. Each of these screw bolts 26 has a head formed with non-circular sockets 27 which are adapted for engagement by a wrench for rotative purposes.

Overlying this flange 24 is a sheet of asbestos 28 which is clamped against this flange 24 by an outer front panel 29. It is the screw bolts 26 which achieve this clamping action.

As shown in Figures 1 and 2, certain of the screw bolts 26 have their heads 27 formed with an opening 30 through which passes the wire of a seal, such as indicated at 31 in Figure 1. With the seal 31 intact, those in authority may have definite assurance that the contents of the light have not been tampered with since the last time it was assembled.

Extending inwardly from each of the side walls 10 and 11 are three rib-like shelves 32, 33, and 34. A piece of material having good shock absorbing properties, such as sponge rubber, has its edges received between the ribs 33 and 34 on the opposite side walls 10 and 11. This piece is designated 35. In the space defined by side walls 10 and 11, bottom 13, and shock absorbing material 35, a pair of batteries 36 and 37 are housed. These batteries are referred to as the battery assembly and another sheet of shock absorbing material comparable to that at 35 is interposed between the outermost battery 37 and the lining 28, this being shown at 38 in Figure 2.

A base member 39 is secured in position by having its side edges anchored between the ribs 32 and 33 on the side walls 10 and 11. In order to achieve this anchorage, pieces of rubber packing, which in their assembled form have a U-shaped cross section, are employed. These members are designated 40 and are clearly shown in Figures 1 and 3. Between the rear edge of the base 39 and the rear wall lining 21 is another strip of packing material 41.

Secured to the upper face of the base member 39 is a condenser 42. Obviously, the capacity of this condenser may be varied with various lights, but for the purpose of illustration, it will be noted that this condenser has a capacity of .5 mfd. Upstanding from the upper face of the base 39 immediately to the rear of the condenser 42 is an angle bracket 43. Secured to the upper free edge of this bracket is a mercury switch 44. Extending forwardly from the bracket 43 is a light bulb 45 which preferably is of the neon type and which is commercially sold under the designation NE17GE. Obviously, the watts which are consumed by this light could be varied but for the purposes of describing one specific embodiment this bulb 45 is identified as being of ¼ watt.

Carried by the tubular light 45 is a reflector 46 which is positioned opposite aligned openings 47 formed in the front panel 29 and lining 28 respectively.

In order to definitely guard against injury to the electrical elements 42, 44, and 45, the space above the base member 39 is filled with packing, such as shown at 48 in Figure 3. This packing is disposed about the various electrical elements as well as the reflector 46 and serves to securely hold these parts in position and at the same time protecting them from damage which might be caused by shocks and jars to the casing.

A colored lens 49 is held in position over the opening 47 by a cup-shaped member 50 that is threaded into a coupling member 51 that is welded to the outer face of the panel 29. This lens may be protected by a guard made up of crossbars 52 which extend across the outer edge of the coupling member 51.

The various electrical elements above described are identified in the wiring diagram of Figure 4 which is also shown as including a resistor 53 which for the particular installation being described has a resistance of 3.3 mg. The batteries shown at 36 and 37 have a voltage of 67½ volts and it is evident that batteries of comparable strength would have to be employed if the light is to have the long service life which is intended for it.

The various parts are assembled in the manner above described with all the various electrical elements, including the circuit, completely enclosed and sealed within the casing C. With the light in a position in which the bottom 13 is substantially horizontal, the mercury switch 44 closes the circuit. This means that the condenser builds up a sufficient charge so that when it discharges, the light bulb 45 is illuminated. Just as soon as one discharge takes place, the light blinks and the condenser begins to build up another charge. What is provided in effect is a blinking light. When it is desired to break the circuit, the casing C must be moved to a position in which the mercury in the switch 44 falls away from its contacts by gravity action. This can be accomplished by tilting the casing C sidewise so that it rests on the side panel 29.

It has been found that a light built in accordance with the above description and with the electrical elements having the capacities designated, therefore has given 1600 hours of service life and apparently is functioning as efficiently as when originally assembled.

While a preferred specific embodiment of the invention is hereinbefore set forth, it is to be clearly understood that the invention is not to be limited to the exact constructions, mechanisms, and devices illustrated and described because various modifications of these details may be provided in putting the invention into practice within the purview of the appended claims.

What is claimed is:

1. In a light of the character described, a casing defined by a bottom, an arched top, side walls, a rear wall, and a removable front panel, a base member secured to the side walls of said casing and dividing the interior of said casing into two compartments, a battery in the lower of said compartments, an electric bulb in the upper of said compartments, a condenser on the upper face of said base member connected in parallel across said light bulb, an electrical circuit including said battery, light bulb, and condenser, a mercury switch in said circuit, said front panel being formed with an aperture through which said bulb is visible, and means for sealing said front panel in position on said casing.

2. In a light of the character described, a casing defined by a bottom, an arched top, side walls, a rear wall, and a removable front panel, a base member secured to the side walls of said casing and dividing the interior of said casing into two compartments, a pair of batteries in the lower of said compartments, packing interposed between said batteries, and the inner faces of the walls defining said compartments, an electric bulb in the upper of said compartments, a condenser on the upper face of said base member connected in parallel across said light bulb, an electrical circuit including said battery, light bulb, and condenser, a mercury switch in said circuit, packing in said upper compartments about said light bulb and mercury switch, said front panel being formed with an aperture through which said bulb is visible, and means for sealing said front panel in position on said casing.

3. In a light of the character described, a casing defined by a bottom, an arched top, side walls, a rear wall, and a removable front panel, a base member secured to the side walls of said casing and dividing the interior of said casing into two compartments, a battery in the lower of said compartments, an electric bulb in the upper of said compartments, a condenser on the upper face of said base member connected in parallel across said light bulb, an electrical circuit including said battery, light bulb, and condenser, a mercury switch in said circuit, said front panel being formed with an aperture through which said bulb is visible, means for sealing said front panel in position on said casing, a lens in said aperture, and a guard over said aperture protecting said lens.

ORLAND D. McNAIL.

REFERENCES CITED

The following references are of record in the file of this patent:

UNITED STATES PATENTS

| Number | Name | Date |
|---|---|---|
| 2,263,518 | Riner | Nov. 18, 1941 |
| 2,312,649 | Kelly | Mar. 2, 1943 |
| 2,482,266 | Goshorn | Sept. 20, 1949 |